United States Patent
Eckert et al.

(10) Patent No.: US 10,859,107 B2
(45) Date of Patent: Dec. 8, 2020

(54) WOOD SCREW HAVING A CRESCENT-SHAPED PROTRUSION BETWEEN THREAD TURNS

(71) Applicant: Würth International AG, Chur (CH)

(72) Inventors: Rainer Eckert, Weikersheim (DE); Andreas Wunderlich, Kupferzell (DE)

(73) Assignee: Würth International AG, Chur (CH)

( * ) Notice: Subject to any disclaimer, the term of this patent is extended or adjusted under 35 U.S.C. 154(b) by 296 days.

(21) Appl. No.: 15/956,146

(22) Filed: Apr. 18, 2018

(65) Prior Publication Data

US 2018/0298934 A1    Oct. 18, 2018

(30) Foreign Application Priority Data

Apr. 18, 2017    (DE) .................... 10 2017 108 225

(51) Int. Cl.
*F16B 25/00* (2006.01)
*B21H 3/02* (2006.01)

(52) U.S. Cl.
CPC ...... *F16B 25/0078* (2013.01); *F16B 25/0015* (2013.01); *F16B 25/0084* (2013.01); *B21H 3/02* (2013.01)

(58) Field of Classification Search
CPC .... F16B 25/0015; F16B 25/10; F16B 25/103; F16B 25/0078
USPC .............................. 411/344, 386, 387.2, 311
See application file for complete search history.

(56) References Cited

U.S. PATENT DOCUMENTS

| | | | |
|---|---|---|---|
| 2,263,137 A | | 11/1941 | Oestereicher |
| 5,015,134 A | * | 5/1991 | Gotoh |
| 5,273,383 A | | 12/1993 | Hughes |
| 6,328,516 B1 | * | 12/2001 | Hettich |
| 6,672,812 B1 | * | 1/2004 | Lin |
| 6,739,815 B2 | | 5/2004 | Takasaki |
| 7,704,030 B2 | * | 4/2010 | Chen |
| 8,480,342 B2 | * | 7/2013 | Stiebitz |
| 9,850,935 B2 | * | 12/2017 | Shih |
| 10,054,147 B2 | * | 8/2018 | Hubmann |
| 2003/0231940 A1 | | 12/2003 | Lin |
| 2013/0039720 A1 | | 2/2013 | Shih |

FOREIGN PATENT DOCUMENTS

| | | |
|---|---|---|
| CN | 1 188 859 A | 7/1998 |
| DE | 38 23 834 A1 | 1/1990 |
| DE | 199 42 779 A1 | 3/2001 |
| DE | 10 2011 002 962 A1 | 7/2012 |
| DE | 10 2014 205 464 A1 | 9/2015 |
| EP | 0 939 235 A1 | 9/1999 |

(Continued)

OTHER PUBLICATIONS

Patent Office of Taiwan, Office Action in Application No. 107113149, dated Mar. 7, 2019, 30 pp.

(Continued)

*Primary Examiner* — Flemming Saether
(74) *Attorney, Agent, or Firm* — Robert A. Blaha; Smith Tempel Blaha LLC

(57) ABSTRACT

A wood screw, having a shaft, a screw tip, and thread turns. The thread turns run circumferentially on at least a portion of the shaft, preferably through or into a screw tip. The wood screw includes at least one arc-shaped protrusion between at least two adjoining ones of the thread turns.

17 Claims, 5 Drawing Sheets

(56) References Cited

FOREIGN PATENT DOCUMENTS

| | | |
|---|---|---|
| EP | 1 411 252 A2 | 4/2004 |
| EP | 2 665 941 A1 | 11/2013 |
| EP | 2 665 941 B1 | 11/2013 |
| EP | 2 679 835 A1 | 1/2014 |
| TW | I592582 B | 7/2017 |
| TW | 201821704 A | 6/2018 |
| WO | WO 2016/180661 A1 | 11/2016 |

OTHER PUBLICATIONS

Extended European Search Report in EP Application No. 19211612.7; dated Feb. 28, 2020; pp. 1-11; European Patent Office, 80298, Munich, Germany.

* cited by examiner

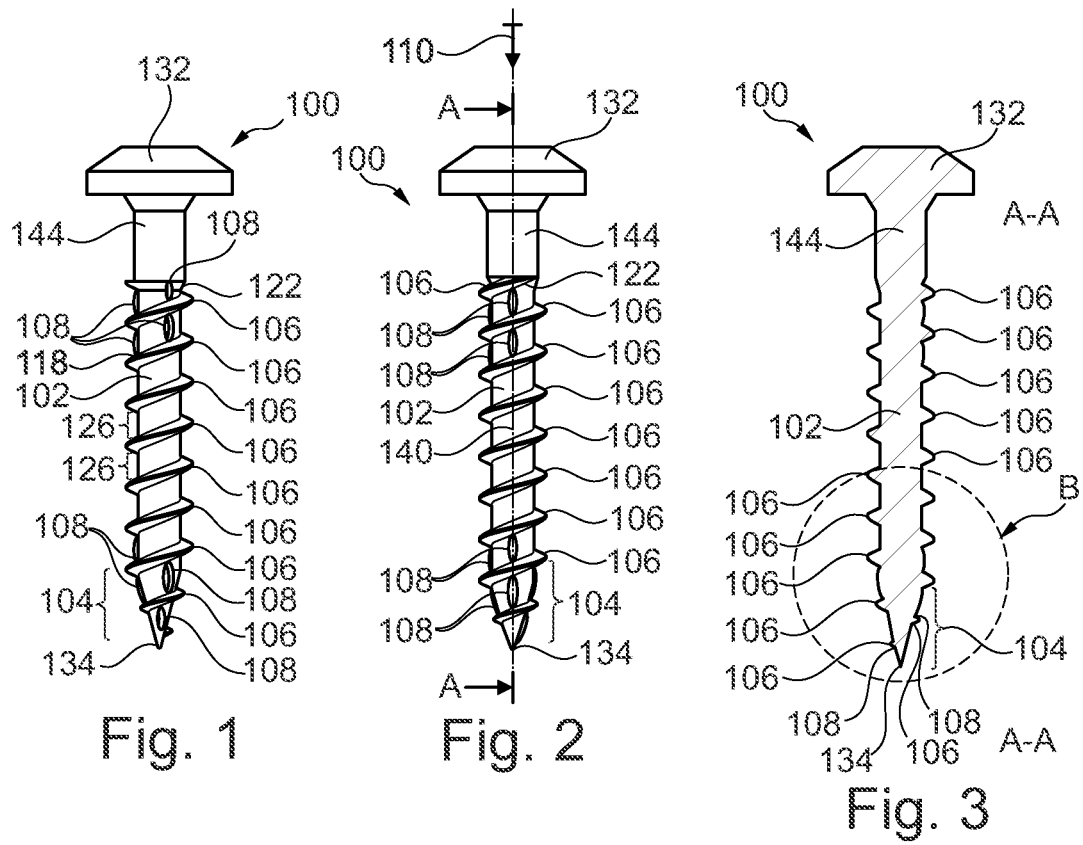
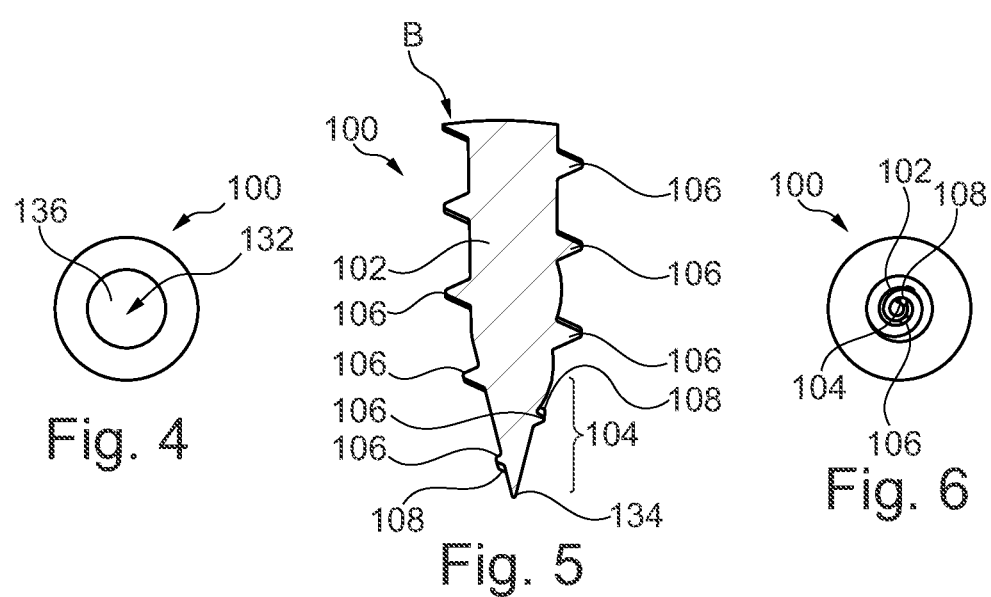

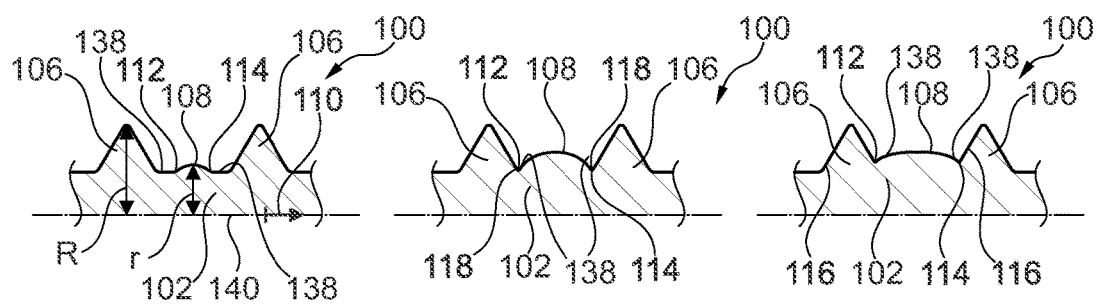
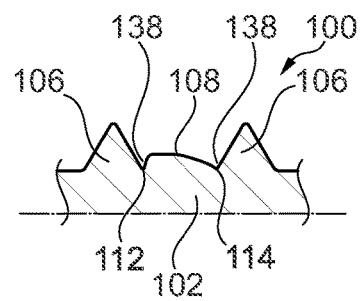
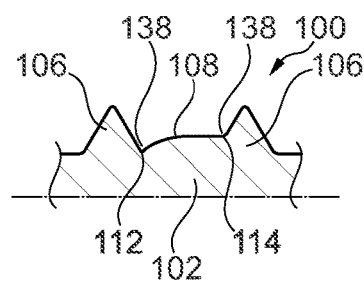
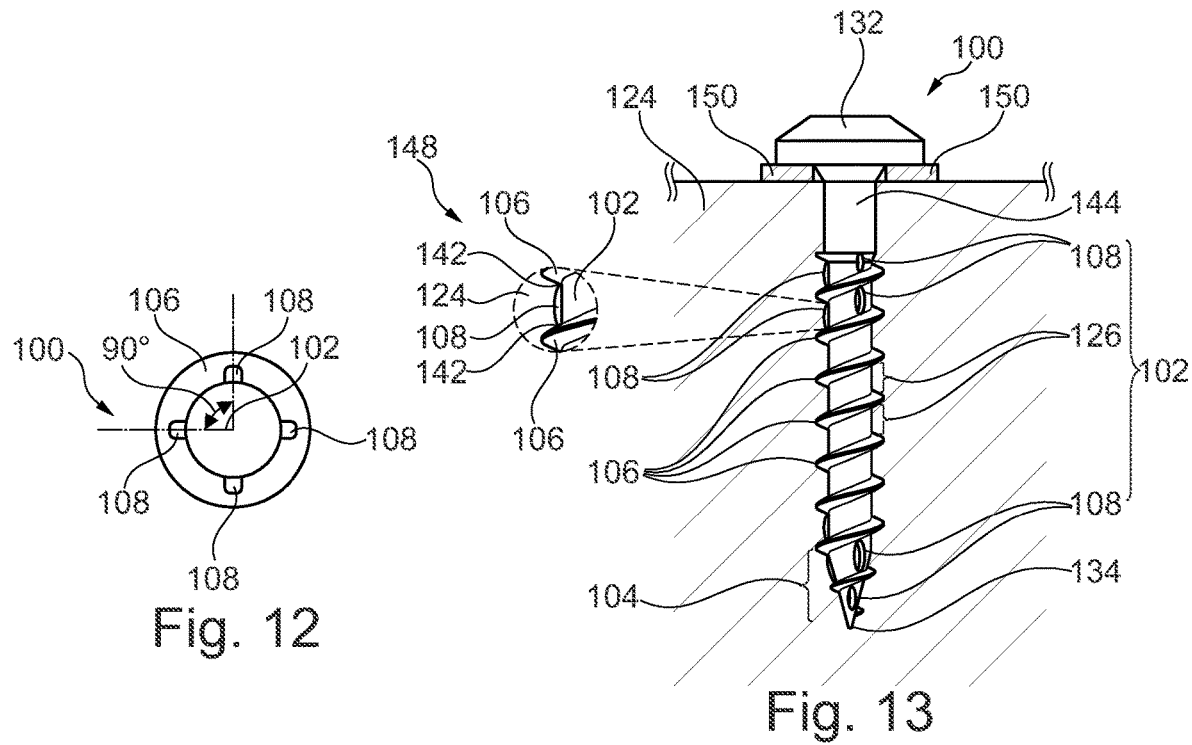

WOOD SCREW HAVING A CRESCENT-SHAPED PROTRUSION BETWEEN THREAD TURNS

CROSS-REFERENCE TO RELATED APPLICATION

The present patent application claims the benefit of the priority date of the German patent application no. DE 10 2017 108 225.5, filed Apr. 18, 2017, which is incorporated herein by reference in its entirety.

TECHNICAL FIELD

The invention relates to a screw, a method for inserting a wood screw into a wood substrate, a method for manufacturing a wood screw, and a use.

TECHNOLOGICAL BACKGROUND

A screw is a bolt, which may have a drive, wherein the bolt is externally provided with a thread. In screws having a head, the annular face under the head acts as an abutment against the component part to be fixed with it.

Upon inserting a screw into wood, the forming of a pilot hole is sometimes dispensed with, then, a wood screw can be screwed into a solid wood substrate pilot-hole-freely (or in a manner without forming a pilot hole). At the same time, the thread of a wood screw cuts itself its counter-thread into the wood substrate. An example for a known wood screw is the screw ASSY® Plus or ASSY® 3.0, which are marketed by the company Würth. A measure for the quality of the anchoring of a wood screw in a wood substrate is the extraction value (or pulling-out value). This refers to the drag force (or tensile force), which is necessary for extracting (or pulling out) the wood screw from the wood substrate, thus for overcoming the retention force (or holding force) of the wood screw in the wood substrate. ASSY® is a registered trademark of Würth International AG Corporation of Chur, Switzerland.

Even though the known wood screw of the type ASSY® Plus and/or ASSY® 3.0 already shows very good extraction values, a further improved extraction resistivity of a wood screw would nevertheless be desirable.

The commercially marketed screw SPAX® 4CUT has a quadrangular characteristic in the transition from the thread to the shaft. The advantage of this screw consists in the reduction of the screwing-in torque. Thus, the SPAX® 4CUT can be processed uniformly and with a low effort. Furthermore, also the energy reserves of a battery-operated tool are conserved. SPAX® is a registered trademark of the Altenloh, Brinck & Co. GmbH & Co. KG of Ennepetal, Germany.

DE 102014205464 A1 discloses a screw, which has a thread, which extends from a screw drive end of a cylindrical screw shaft through to a screw tip. The screw tip is located at an end of the front cone section of the screw. The screw has four ribs running in an axial direction, which ribs begin in a front end of the cylindrical screw shaft and reach to almost the screw tip. In the area of the screw drive end, the screw also has four ribs, which are arranged offset in a circumferential direction by half of the angular distance between respective two ribs.

EP 1411252 A2 discloses a screw having a shaft, which is formed with an operating head at one of its two ends and with a conical tip at the other one of its two ends, and which is formed with a screw thread at the conical tip and in the area adjoining thereto [to the conical tip]. The shaft is, in its area adjoining to the conical tip, between the thread turns, formed with ribs, which run transversely to the rotation direction of the screw, by which ribs the material is compacted by displacement upon screwing-in of the screw.

EP 2665941 A1 discloses a particle board screw having a screw head, a screw shaft, a screw tip, a thread, which extends over (or across) at least a part of the screw shaft and/or the screw tip, and having plural scraping ribs, which run in a longitudinal direction of the screw and which have a triangular cross-section having a flat-topped tip.

Milling cutters can thus be arranged on a screw at the screw tip, which milling cutters run parallel to the screw axis and have a constant square-shaped or triangular-shaped cross-section. These milling cutters reduce the screwing-in torque of the screw upon screwing-in into wood. However, such a screw loses retention force in the wood by the effect of the milling cutters, because the wood is milled and/or destroyed physically between the supporting thread turns in a built-in state of the screw. The higher the milling cutter is formed radially, the more the extraction forces are reduced.

SUMMARY

There may be a need to establish a wood screw, by which cleaving forces (or delamination forces) can be reduced and nevertheless high extraction forces can be achieved.

This need is solved by the improved fastener having at least one crescent-shaped protrusion between at least two adjacent thread turns, wherein in a front view of the fastener, a main extension direction of the crescent-shaped protrusion deviates counter-clockwise from an axial direction of the shaft by an angle being greater than 0° and less than 90°. Further examples are more precisely defined below.

According to an example embodiment of the present invention, there is provided a wood screw, which has a shaft, a screw tip, thread turns that run circumferentially on at least a portion of the shaft (in particular through into the screw tip), and at least one arc-shaped (or dome-shaped) protrusion (or arcuate projection) (in particular formed as a milling cutter) between at least two adjoining ones of the thread turns.

According to another example embodiment of the present invention, there is provided a method for inserting a wood screw, having the features described above, into a wood substrate (in particular into a solid wood substrate), wherein, in the method, the wood substrate is provided (in particular without a pilot hole of a drill hole in the wood substrate, into which the wood screw is introduced), and the wood screw is screwed into the wood substrate (in particular pilot-hole-freely, and/or self-furrowingly or thread-cuttingly).

According to still another example embodiment of the present invention, there is established a method for manufacturing a wood screw, wherein, in the method, a shaft and a screw tip that adjoins thereto axially (in particular directly, i.e. without a further structure arranged there between, or indirectly, i.e. with at least one further structure arranged there between) are formed, thread turns that extend circumferentially on at least a portion of the shaft (in particular through into the screw tip) are formed, and at least one arc-shaped protrusion between at least two adjacent ones of the thread turns on the shaft and/or on the screw tip is formed.

According to a further example embodiment of the present invention, a wood screw having the features described above is used for inserting into a wood substrate, in particular pilot-hole-freely (or without a pilot hole).

OVERVIEW OF EMBODIMENTS

In the framework of the present application, the expression "arc-shaped protrusion" (or arcuate projection) can be understood to refer to an upheaval or convexity, which may extend in a radial direction with respect to the shaft and/or the screw tip, and which may have at least (piecewise) the shape of one or plural arcs. Such an arc-shaped protrusion can be formed in particular as an axial convex body. Such a convex body may grow out of the shaft, may then widen out in an axial direction until a radial maximum thickness, and may then grow back again into the shaft further in the axial direction. In an embodiment, the arc-shaped protrusion may consist of precisely one curved arc. In another embodiment, the arc-shaped protrusion can be formed in sections or pieces, and may have, in addition to this, one or plural further sections, for example one or plural further arcs. Such an arc shape can be formed by a continuous or end-to-end curvature of the protrusion between two ends with temporary formation of a local maximum. However, also gradings (or increments) in the form of edges or steps at the arc-shaped protrusion may be possible. The arc shape can be formed in an axial direction of the wood screw. Alternatively or supplementarily, however, the arc shape may also be formed in a tangential direction of the wood screw and/or of the shaft. If a protrusion has arc-shaped components both in an axial direction and also in a tangential direction, the axial extension of the arc-shaped protrusion may be longer than the tangential extension of the arc-shaped protrusion.

In the framework of the present application, the expression "shaft" or bolt can be understood in particular to refer to an axially and radially central section of the wood screw, which [section] may be arranged in an axial direction between a screw tip and another end of the wood screw, which end may be opposite to the screw tip. Such a shaft may, for example, be a constant radius (or cylindrical) body, on which thread turns may be formed to project radially. One or plural arc-shaped protrusions may also be formed on the shaft at least partially. Optionally, a thread-free section may join an end of the shaft, which [end] is opposite to the screw tip, a screw head may join directly or indirectly, or the wood screw, which may then be formed as a bolt-type, may end without a radially widened-out screw head.

In the framework of the present application, the expression "thread turns" can be understood to refer in particular to a raising (or elevation with respect to the shaft), which may run helically around the shaft and/or the screw tip, and which may promote a screwing-in of the wood screw into a substrate and may increase the extraction forces. Such a thread, which may be formed by the thread turns, may in particular be formed as a self-cutting or self-furrowing thread. Further advantageously, the thread turns may, even in a pilot-hole-free inserting of the wood screw into a substrate, form a counter-thread in the substrate in a self-cutting and/or self-furrowing manner.

In the framework of the present application, the expression "screw tip" can be understood to refer in particular to an axial end section of the wood screw, which [end section] may be radially tapered with respect to the shaft. The end section may, upon normal inserting of the wood screw into a substrate, penetrate into the substrate as a first section of the wood screw. The screw tip may, for example, taper punctiformly (or point-shapedly) towards the end of the wood screw. The screw tip may then be formed for example cone-shapedly (or conically). Alternatively, the screw tip may, for example, end at the end of the wood screw in a rectilinear or curved cutting edge.

According to an example embodiment, there may be established a wood screw, which may be insertable into a substrate (in particular a wood substrate) with high extraction values and low cleaving tendency. If the wood screw is inserted (in particular screwed-in) into the substrate (which is in particular formed of wood), for example, by means of a driving tool (such as a screw driver or a cordless screw driver), the at least one arc-shaped protrusion may reduce an otherwise existing tendency of the thread turns to cleave the substrate (in particular the wood). The arc shape may avoid an excessive destruction of the material of the substrate. Instead of promoting a cleavage of the substrate, the configuration of thread turns and at least one arc-shaped protrusion may result in that the material of the substrate collects with little destruction in the intermediate area between thread turns and the at least one arc-shaped protrusion and/or may be compacted there. In particular, in this area, wood fibers of a wood substrate can be compressed and/or swaged and/or divided or cut through. By the suppressing of an undesired cleaving effect, the mechanical integrity of the wood or other substrate can be preserved to a large extent, whereby the extraction forces (or pulling-out forces) of the wood screw may be increased. This high extraction force may be promoted in addition by the accumulating of wood fibers or other material of the substrate in the intermediate spaces between the one or plural arc-shaped protrusions on the one hand and the thread turns on the other hand. Therefore, when inserting the wood screw into the substrate, at first the screw tip may penetrate into the substrate, in particular and preferably without a pilot hole. Subsequently, the screw tip may pit itself deeper and deeper into the substrate, wherein subsequent thread turns may effect a thread anchoring of the wood screw in the wood. The arc-shaped protrusions may increase the insertion force of the wood screw into the substrate at the most moderately, however, may provide with advantage for a gathering, compression and/or displacement of wood fibers or other material of the substrate, without significantly destroying the latter [material]. In result, a strong anchoring force of the wood screw in the (wood) substrate may be effected, which may increase the extraction forces further. The (in particular wood) material of the substrate may be left untouched to a large extent during the inserting of the wood screw, which may increase the retention forces further. According to an embodiment example having one or plural protrusions having an arc shape, thus, a low cleaving force with at the same time high extraction forces may be achieved.

In the following, additional example embodiments of the screw, the method and the use are described.

According to an example embodiment, the maximum radial extension of the at least one arc-shaped protrusion may be smaller than a maximum radial extension of the thread turns. Stated differently, the at least one arc-shaped protrusion may, at its most abaxial position, extend, starting from the screw axis, less far away in a radial direction than a radial outer edge of the thread turns. Thereby, an excessive application of frictional force and/or an excessive destruction of the screwing-in substrate due to the at least one arc-shaped protrusion on/in the (in particular wood) substrate may be avoided, and consequently, the insertion force may be kept moderately. The described configuration of the at least one arc-shaped protrusion may effectively suppress a cleaving effect by the thread turns in particular of wood material. At the same time, the anchoring force of the wood screw in the substrate may be improved.

According to an embodiment example, the at least one arc-shaped protrusion may extend completely or partially in an axial direction. The at least one arc-shaped protrusion may be delimited substantially rectilinearly between a first end and a second end of the protrusion, wherein in one embodiment example the ends may not extend further than to the directly neighboring thread turns. According to an embodiment, thus, the arc-shaped protrusion may extend parallel to the screw axis. Alternatively, in respect of its extension direction, the arc-shaped protrusion may also comprise a tangential component.

It is also possible that the at least one arc-shaped protrusion may extend at an angle of 90°, that is perpendicular, to the screw threads. In the latter implementation, the effective face (or operating surface) may, with advantage, be oriented perpendicular to the thread turns, which may be at an angle with respect to an axial direction. The at least one protrusion may thus run at an angle to the axial direction, in particular perpendicular to a respective thread turn.

According to an example embodiment, at least one end of two mutually axially opposite ends (or two ends that are axially opposite to each other) of at least one of the at least one arc-shaped protrusion may end on a flank of one of the thread turns. A respective thread turn may be characterized by a rising and a falling flank, between which there may be present a position of a maximum radial extension of the thread turn. If tails (or extensions) of the at least one arc-shaped protrusion extend through and into an adjacent flank section of a respective neighboring thread turn, this thread turn and the respective arc-shaped protrusion may form a particularly stable mechanical unit.

According to an example embodiment, at least one end of two mutually axially opposite ends of at least one of the at least one arc-shaped protrusion may end precisely at a transition (in particular at a kink) between a thread turn and the shaft. According to the described embodiment, tails of the arc-shaped protrusion may extend exactly through to a transition between the shaft and the respective thread turn. Thereby, the thread turn may remain unaffected irrespective of the provision of the protrusion. At the same time, a sufficiently long axial extension of the at least one arc-shaped protrusion may be ensured. The result may be a high extraction force with a low cleaving tendency in connection with a moderate installation force (or placement force) of the screw.

According to an example embodiment, at least one end of two mutually axially opposite ends of at least one of the at least one arc-shaped protrusion may end at the shaft at a distance to an adjoining thread turn. According to such an embodiment, the influence on the screwing-in process by the thread turns may be particularly small, which may enable an inserting of the wood screw with low force also by hand. At the same time, the freely remaining intermediate spaces between the respective flanks of the front side or rear side thread turn on the one hand and the respective end of the arc-shaped protrusion on the other hand may be backfilled with material of the substrate (in particular with displaced wood fibers) during the inserting into the substrate, whereby the extraction force may become particularly strong.

According to an example embodiment, at least one of the at least one arc-shaped protrusion(s) may have its maximum radial extension in an axial direction centrally between two neighboring ones of the thread turns. In particular, the local axial maximum of the arc-shaped protrusion in respect of its radial distance from the shaft and/or the screw axis may lie precisely in the middle (or center) between two thread turns that are directly adjacent to the arc-shaped protrusion. Thereby, a symmetric arrangement may be established, which in result may lead to a symmetric transmission of force from the wood screw on the wood substrate. Zones of excessive compression of wood fibers may thereby be avoided, such that the wood material may remain intact to a large extent and the extraction force may be increased.

According to an example embodiment, the screw tip may be cone-shaped (or conical). Such a screw tip, which may taper conically through to a pointed end point, may enable a particularly low-force inserting of the wood screw into the substrate and a continuous widening-out of the same, so as to prepare the basis for the subsequent insertion of the radially wider shaft with its thread turns in the substrate. Also, by a cone-shaped tip, the material of the substrate may be protected from an excessive impairment, wherein in particular, displaced wood fibers may remain substantially intact.

According to an example embodiment, the at least one arc-shaped protrusion may have, in its main extension direction (and/or longitudinal extension direction, for example the vertical direction in FIG. 2) and/or perpendicular to its main extension direction (i.e., in its transverse extension direction, for example the horizontal direction in FIG. 2), a shape, which may be selected from a group that consists of: a crescent shape, a semi-circle shape, a triangle shape, a rectangle shape, a square shape, a trapezoid shape, a polygon shape, and a shape having at least two merging (or transitioning to each other) (in particular merging in an axial direction) sections of the shapes mentioned before. A crescent-shaped geometry of the at least one arc-shaped section (or protrusion) in the axial direction may be particularly preferred. Thereby, an inserting of the wood screw into a substrate with particular low force may be enabled, that is the mounting force may be kept low. At the same time, this may enable a propulsion of the wood screw with a soft-force-influence on the substrate, which may protect the latter from an excessive damage and thereby may increase the extraction values of the wood screw.

According to an example embodiment, the at least one arc-shaped protrusion may run, starting from its central (in particular or axially offset with respect to a center) position, with a maximum radial extension symmetrically or asymmetrically in a direction from two directly neighboring thread turns to mutually axially opposite ends of the protrusion.

In particular, with respect to the position of the maximum radial extension of the arc-shaped protrusion, the section thereof at the side of the screw tip and the section thereof at the far side with respect to the screw tip (for example, at the side of the screw head) may be formed mirror-symmetrically to each other (see for example FIG. 7 to FIG. 9). An according mirror plane may run through the position of the maximum radial extension of the arc-shaped protrusion and perpendicular to an axial screw axis. Such a configuration may result in a uniform force transmission on the different areas of the wood screw at the near side and at the far side of the maximum radial extension of the arc-shaped protrusion and the substrate. Then, in addition, two mirror-inverted (or mirror-imaged) undercuts may be formed between the protrusion and adjoining thread turns, in which undercuts respectively wood fibers or other displaced substrate material may be compressed with little destruction and received so as to further increase the extraction force.

Alternatively, an asymmetrical force transmission into the wood screw and the substrate may be effected by a deliberate asymmetrical arrangement of the arc-shaped protrusion in the axial extension direction (see for example FIG. 10 and FIG. 11). Such an arc-shaped protrusion may key in demonstratively particularly strong in the surrounding material of the substrate, in particular with wood fibers of the latter. In such an asymmetrical configuration, thus, the balance point of the material of the arc-shaped protrusion may be shifted in the direction of a thread turn at the screw tip side or in the direction of a thread turn at the far side with respect to the screw tip. Thereby, undercuts may be generated, which are pronounced stronger or weaker.

According to a preferred example embodiment, at least one of the at least one arc-shaped protrusion(s) may be formed as a sharp-edged milling cutter, i.e. for removing material of the substrate by milling. In the framework of the present application, milling can be understood to refer in particular to a machining (or chipping) method for the production of a drill hole in the substrate with a geometrically defined shape, in which material may be removed from the substrate in the form of chips. In such a machining (or chip-cutting) by the one or plural milling cutters in the form of a respective arc-shaped protrusion, the material of the substrate may be removed locally by the milling cutter and/or the mill rotating about its own axis due to the inserting of the wood screw into the substrate. According to such a preferred example embodiment, the arc-shaped protrusion, which may be provided with an arc-shaped milling edge and/or cutting edge, may act as a milling cutter and may effectively cut material of the substrate by milling. In this embodiment, thus, material of the substrate may not only be displaced by the occupied area of the arc-shaped protrusion, but may also be separated or divided from the remaining material of the substrate by cutting. In the example of a wood substrate, this may result in a separating of wood fibers delimited to the direct surrounding area of the arc-shaped protrusion. The milling away of material of the substrate may result in a low installation force during the inserting of the wood screw into the substrate. Furthermore, by this measure, the cutting of a thread in the substrate may be alleviated and/or assisted by the thread turns. Due to the locally strictly delimited milling action of the at least one protrusion, the substrate nevertheless may remain untouched in large volumes, such that a high extraction force may be achieved.

According to an example embodiment, at least one of the at least one arc-shaped protrusion(s) may have a blunt edge. Alternatively or in addition to the embodiment described above, the arc-shaped protrusion may also be provided selectively with a blunt outer edge, so as to avoid a separating and thereby weakening of the substrate surrounding the wood screw. Demonstratively, the blunt edge may result more in a compression of the wood than in a dividing (or cleaving). This may result in a particularly strong extraction force.

According to an example embodiment, at least one of the at least one arc-shaped protrusion(s) may be formed completely in the area of the shaft. In an embodiment example, the shaft with its thread turns may define (disregarding an optional screw head) the radially widest area of the wood screw along its axial extension. If one or plural radial arc-shaped protrusions are put on and/or patched on or formed on in the area of the shaft on the latter, a radially particularly far outside displacement effect on the substrate material may be applied, and thus, a particularly effective increase of the extraction force may be effected.

If one or plural of such arc-shaped protrusions are arranged in an end section of the shaft most far from the screw tip (in particular at the side of the screw head) between thread turns that are present there, this may result in that the presence of the arc-shaped protrusions, which may increase the installation force (or insertion force) in a certain manner becomes effective only at the end of the installation process. Then, with advantage, the arc-shaped protrusions may not result in an increase of the installation force over a longer time period of the installation process.

According to an example embodiment, at least one of the at least one arc-shaped protrusion(s) may be formed completely in the area of the screw tip. For the arrangement of one or plural arc-shaped protrusions in the area of the screw tip, the force transmission from the at least one arc-shaped protrusion into the substrate material may be effected in an area that is radially relatively close to the axis and in an area of a most deep [portion] of the drill hole. Thereby, the local arc-shaped protrusion that may be present there (or deep in the material) may act in a cleaving-reducing, stabilizing, and extraction-impeding manner.

According to an example embodiment, at least one of the at least one arc-shaped protrusion may extend between the shaft and the screw tip, thus partially in the shaft area and partially in the screw tip area. In the transition area or bridging area between the screw tip and the shaft, a change of the force effect from the wood screw on the substrate may be effected during the inserting process. Thus, the risk of cleaving may be particularly high in this area. If an arc-shaped protrusion is arranged piecewisely still in the shaft and piecewisely already in the screw tip, an undesired cleaving of the (in particular wood) substrate may be effectively avoided especially at this critical position.

According to an example embodiment, at least two arc-shaped protrusions may be offset to each other angularly tangentially (i.e., in the circumferential direction of the shaft, in which also the thread turns may extend). In particular, plural arc-shaped protrusions may be offset to each other with a respective same tangential angular distance. When arranging plural arc-shaped protrusions with an (in particular constant) angular offset relative to each other, a substantially symmetrical force field may be produced also in the circumferential direction of the wood screw. This may reduce further the tendency of the thread turns as to a cleaving effect on the (in particular wood-fiber-type) substrate. Also, in respect of the extraction force, circumferential weak points of the wood screw may be avoided, if plural angularly offset arc-shaped protrusions are formed.

According to an example embodiment, plural arc-shaped protrusions (in particular one or more groups of protrusions or even all arc-shaped protrusions) of the wood screw may be formed aligned in the axial direction. For an aligned arrangement of all or plural arc-shaped protrusions aligned along a linear notional connection axis, a scraping and/or cutting axis may be defined exactly.

According to a preferred example embodiment, the wood screw may have plural arc-shaped protrusions, which may be aligned in the axial direction, in the area of the screw tip, and plural arc-shaped protrusions, which may also be aligned in the axial direction, in an end section of the thread turns of the shaft at the side of the screw head. In such an embodiment example, which is for example represented in FIG. 1 to FIG. 6, there may be established both a cleaving-impeding and also extraction-force-increasing effect both in the area of the substrate deep in the borehole and near the surface. This may result in particularly high extraction values with strongly suppressed cleaving tendency.

According to an example embodiment, the wood screw may be formed for a pilot-hole-free inserting into a wood substrate (in particular into a solid wood substrate). Even if a use of the wood screw is possible in different materials of a substrate, this use of the wood screw, that is, for inserting into a wood substrate, may be particularly preferred. At this time, the wood substrate may concern further preferably a solid wood substrate, which may have intact wood fibers prior to the installation of the wood screw. Alternatively, however, the inserting into a wood composite substrate may also be possible. A substrate, into which a wood screw according to an example embodiment of the invention can be inserted, may thus consist wholly or only partially of wood. For example, such a substrate may be a particle board (or chip board) or an OSB (oriented strand boards) board or an oriented structural board (or course chip board). Wood, in particular solid wood, may tend to be cleaved undesirably during a strong application of force by sharp thread turns. This may destroy the wood substrate and may reduce the retention force of a screw, which is inserted into this wood substrate. If the tendency of the wood fibers of cleaving during the propulsion (or insertion) of the wood screw into such a wood substrate can be suppressed reliably by the described measures, in particular the at least one arc-shaped protrusion having the described features, the wood material may accumulate densely (or closely) in an area of an undercut between an arc-shaped protrusion and respective neighboring thread turns, which may result in a particularly high retention force without a far-reaching destruction of the material of the substrate.

According to an example embodiment, an undercut for receiving material of a wood substrate, into which the wood screw is inserted, may be formed between a respective one of the at least one arc-shaped protrusion on the one hand and at least one of the respective two thread turns adjoining thereto. For example, wood fibers or the like may be pushed into such undercut volumes and be compressed there, if the wood screw is screwed-in into a wood substrate.

Preferably, the wood screw may be inserted pilot-hole-freely (or in a manner without drilling a pilot hole) into the substrate (in particular of wood). This may enable a particularly efficient processing of the wood screw at a construction site or at another place of application, because the expensive drilling of pilot holes may be dispensable. Alternatively, it may also be possible, as may be required (for example, in a particularly hard substrate), to form such a pilot hole before the wood screw is installed, which measure then may lead to particularly low installation forces.

Preferably, the thread turns may form a thread, which may be self-cutting or self-furrowing in wood material. Thereby, a reliable formation of thread turns, which may be inverse to the thread of the wood screw, in the wood substrate may be facilitated, in particular for a pilot-hole-free mounting of the wood screw in a wood substrate. Thereby, also a form-fit between the thread turns and the wood substrate may form, which in turn may act to increase the extraction force.

According to an example embodiment, a flank angle of at least a part of the thread turns may be in a range between approximately 30° and approximately 70°, in particular in a range between 40° and approximately 60°. Such flank angles may be advantageous for reaching a particularly good retention force, because the flanks of the thread may then gnaw efficiently at the wood.

According to an example embodiment, the screw tip may taper to a substantially punctiform (or point-shaped) end of the wood screw. According to another example embodiment, the screw tip may have at least one cutting edge at the end. Regarding the implementation of the screw tip, there may thus be different possibilities, wherein the screw tip may be configured advantageously such that the wood screw can be screwed-in into a solid wood substrate without a pilot hole.

According to a first embodiment, the screw tip may taper to a punctiform (or point-shaped) end of the wood screw, wherein the thread may extend, directly starting from the punctiform end, along the screw tip and further along the shaft. Such an embodiment is shown in FIG. 1. If the onset of the thread begins directly at the punctiform end, the thread may grab directly upon setting the punctiform end onto the surface (which is in particular not provided with a pilot hole) of a wood substrate, and may start with the self-furrowing and/or self-cutting penetration into the substrate with this embodiment of the screw tip. Accordingly, a pre-drilling may be dispensed with and an inserting with low force may be enabled, because the forced propulsion of the thread may assist a service technician right from the beginning of the installation process.

According to an alternative second embodiment, the screw tip may be formed as a drill bit, possibly having at least one cutting edge at the end. Such a, for example, linear sharp cutting edge may be formed as at least one main blade edge, and may generate a hole in a wooden substrate as with a drill. Optionally, at least one transverse blade edge may also be provided at the drill bit, as is known to skilled persons in the field of screws and drills.

According to an example embodiment, a screw head or a free bolt end of the wood screw may be provided with a drive for rotatably driving the wood screw. Such a drive may serve for a form-fit contact with a tool for screwing-in the screw, such as for example a muscle-driven screwdriver or a motor-driven installation device (for example a cordless screwdriver). A rear-side end of the wood screw may thus be formed by the screw head having a drive for rotatably driving the wood screw. The drive may be formed as a longitudinal slot, as a crossed slot, as an inbus, as a TORX® drive or as an AW® drive. TORX® is a registered trademark of Acument Intellectual Properties, LLC of Sterling Heights, Mich., U.S.A. AW® is a registered trademark of Würth International AG of Chur Switzerland.

According to an example embodiment, the wood screw may optionally have a thread-free section arranged between the screw head and the shaft having the thread. Demonstratively, the shaft having the thread may extend at the rear side through to a smooth, thread-free area of the wood screw. Thereby, the axial length of the wood screw may be increased, without the thread length being increased excessively.

According to an example embodiment, the wood screw may be driven by rotatably operating a drive (for example, on a front face at a screw head or on a free bolt end of the shaft or of a thread-free section). For example, a muscle-driven screwdriver or a motor-driven screwing device may be used in order to insert the wood screw rotatably into the substrate. A forced propulsion of the wood screw in the substrate may be effected by a self-cutting thread of the wood screw, which may enable the axial penetration of the wood screw in the substrate with low force.

According to an example embodiment, the wood screw may be formed by cold massive shaping (for forming the head and/or the drive), pinching (for forming the screw tip) and rolling (for forming the thread).

According to an example embodiment, the protrusion may be formed at least partially during the rolling of the thread. At this time, only a material relocation, which may be sufficient for forming the protrusion, may be effected, such that the application or removal of material for forming the one or the plural protrusions may be dispensable.

According to an example embodiment, the at least one protrusion may be formed at least partially by pinching the screw tip. Also in this embodiment, the at least one protrusion may be produced without a separate work step being necessary to this end.

According to an example embodiment, the wood screw may have at least one further protrusion, which may extend over (or across, or beyond) one of the thread turns, in particular a further protrusion that intersects one of the thread turns. Such a further protrusion may project out of the (in particular constant radius (or cylindrical)) shaft and/or out of the (in particular cone-shaped) screw tip. A first section of such a further protrusion may be arranged on one side (for example a side at the side of the screw head) of an associated thread turn, whereas an opposite second section of such a further protrusion may be arranged on an opposite other side (for example, a side at the side of the screw tip) of the associated thread turn. Such a further protrusion or plural such further protrusions may thus have a different angle to an axial direction of the wood screw, in particular a smaller angle to the axial direction of the wood screw than the thread turn intersecting the respective protrusion. Also one or plural such further protrusions may contribute to displace wood fibers during the inserting of the wood screw into a substrate having wood or consisting of wood, in order to facilitate the installation of the wood screw in the substrate for a user with a moderate torque and/or to promote a widening-out of the drill hole at its outer side. Further protrusions in a transition area between the thread section and a thread-free section (which may have a slightly larger outer diameter than the thread section) may suppress the bracing (or strutting apart) of the wood, when the thread-free section with its slightly larger outer diameter penetrates into the wood substrate. In this manner, the further protrusions may prepare the area of the hole at the transition between the thread section and the thread-free section. At the same time, an excessive destruction of the wood material of the substrate may be avoided by the function of the one or the plural further protrusions, whereby high extraction forces may be achieved.

According to an example embodiment, the further protrusion may be formed as a milling edge (in order to machine wood material by milling) or bluntly (i.e., for a pure material displacement of wood).

According to an example embodiment, the at least one further protrusion may be provided alternatively or in addition to the at least one protrusion between the thread turns.

According to an example embodiment, the at least one further protrusion may be arc-shaped, in particular crescent-shaped. More generally, the at least one further protrusion may have, in its main extension direction and/or perpendicular to its main extension direction, a shape, which may be selected from a group that consists of: a crescent shape, a semi-circle shape, a triangle shape, a rectangle shape, a square shape, a trapezoid shape, a polygon shape, and a shape having at least two sections of the shapes described before and merging in each other (in particular merging in each other in an axial direction). A crescent-shaped geometry of the at least one further protrusion in the axial direction or at an angle to the axial direction may be particularly preferred. By the described shaping, a penetration of the wood screw into the substrate with particularly low torque may be made possible, and the respective further protrusion may be protected simultaneously from an excessive damage.

According to an example embodiment, the wood screw may have a plurality of further protrusions, which may extend over (or across, or beyond) one of the thread turns, and which may be at a distance from each other in the tangential and/or circumferential direction and which may be arranged circumferentially around the shaft angularly offset. One of the thread turns may thus be provided in the circumferential direction with plural further protrusions that are offset (in particular equidistantly) to each other. In the area of this one or these plural thread turns, which may be provided with the further protrusions, a targeted and defined widening-out of the drill hole without significant damage of the associated wood fibers may be effected.

According to an example embodiment, the at least one further protrusion may be formed in an area of the shaft, to which a screw head or a thread-free bolt section may join. In particular, the at least one further protrusion may be present in an area of the shaft, which may be located opposite to the screw tip. The at least one further protrusion may intersect one of the two thread turns that are most far from the screw tip. Further in particular, the at least one further protrusion may intersect (still further in particular only) one thread turn that may be most far from the screw tip.

According to an example embodiment, the at least one further protrusion may have its maximum radial extension in the area of a respective maximum of the respective thread turn. Demonstratively, the further protrusion may grow out of the shaft, may reach its radial maximum in the intersection area with the associated thread turn, and may subsequently grow into the shaft again.

According to an example embodiment, a maximum radial extension of the at least one further protrusion may be smaller than a maximum radial extension of the associated thread turn. In this manner, it may be ensured that the at least one further protrusion does not impair the thread-forming function of the thread turns. Nevertheless, the further protrusion may realize its wood-displacing and, if applicable, a milling function. In the area of the radial maximum of the further protrusion, the latter may thus extend in a radial direction less far to the outside than the intersected thread turn. Thereby, also an excessive widening-out of the drill hole and an excessive damage of wood material may be avoided, and thus high extraction forces may be achieved.

According to an example embodiment, at least one of the at least one protrusions and of the at least one further protrusion may be arranged running at an acute angle to the axial direction of the shaft. According to this embodiment, the main extension direction of the protrusion and/or of the further protrusion may deviate from an axial direction of the shaft. Demonstratively, the respective protrusion and/or the respective further protrusion may draw an angle to the axial direction of the shaft of greater than 0° and less than 90°, preferably an angle in a range between 5° and 40°, further preferred between 10° and 30°. It has turned out that the force transmission into the substrate may be advantageous for a slight inclination of the respective protrusion and/or further protrusion, and, at the same time, moderate installation forces may be combined with high extraction forces.

According to an example embodiment of the invention, a respective one of the at least one further protrusion or of the plural further protrusions, which may intersect a thread turn, may have an extension direction perpendicular to this thread turn. Stated differently, such a further protrusion may intersect perpendicularly the associated thread turn. According to such an example embodiment, both this thread turn and also the associated protrusion may be arranged running inclined to the screw axis. This geometry may result in a favorable force transmission.

Alternatively or in addition, it may also be possible that a respective one of the one protrusion or of the plural protrusions, which may be arranged between two neighboring thread turns, may have an extension direction perpendicular to these two adjoining thread turns. According to such an embodiment example, both these thread turns and also the associated protrusion may be arranged running inclined to the screw axis. It has turned out, that such a configuration may be advantageous in respect of the force transmission from the wood screw into the substrate.

According to an example embodiment, at least one of the thread turns, in the area of the screw tip, may have at least one notch, in particular plural notches that may be offset to each other in the circumferential direction, in particular in the area of a foremost thread turn at the screw tip. For example, three such notches may be formed at the foremost thread turn at the screw tip in the circumferential direction (for example at an angular distance of respectively 120° to each other) in the form of radial recesses. Such notches may contribute with advantage to mechanically weaken the substrate (in particular of wood) at the beginning of the installation process, and thereby may prepare for the further installation of the rest of the screw. In the transition area between a respective notch and the adjoining section of the associated thread turn, a sharp edge and/or a tooth may form itself, which may work itself into the wood material. In order to not weaken the wood material unduly, one notch or plural notches may be formed only in the foremost thread turn and/or the thread turn that is next to the screw tip.

BRIEF DESCRIPTION OF THE DRAWINGS

In the following, example embodiments of the present invention are described with reference to the following drawings.

FIG. 1 shows a wood screw according to an example embodiment in a front view.

FIG. 2 shows the wood screw according to FIG. 1 in a side view.

FIG. 3 shows the wood screw according to FIG. 1 in a cross-sectional view along a section plane A-A according to FIG. 2.

FIG. 4 shows the wood screw according to FIG. 1 in a top-side view.

FIG. 5 shows a detail B of the wood screw according to FIG. 1, compare FIG. 3.

FIG. 6 shows the wood screw according to FIG. 1 in a bottom-side view.

FIG. 7, FIG. 8, FIG. 9, FIG. 10 and FIG. 11 show details of arc-shaped protrusions in intermediate thread sections between neighboring thread turns of wood screws according to example embodiments of the invention.

FIG. 12 shows schematically a section of a wood screw according to an example embodiment, in which plural arc-shaped protrusions are offset to each other among each other with a respectively same tangential angular distance of 90°.

FIG. 13 shows a wood screw according to an example embodiment after screwing-in into a wood substrate.

DETAILED DESCRIPTION OF EXEMPLARY EMBODIMENTS

Figure 14:
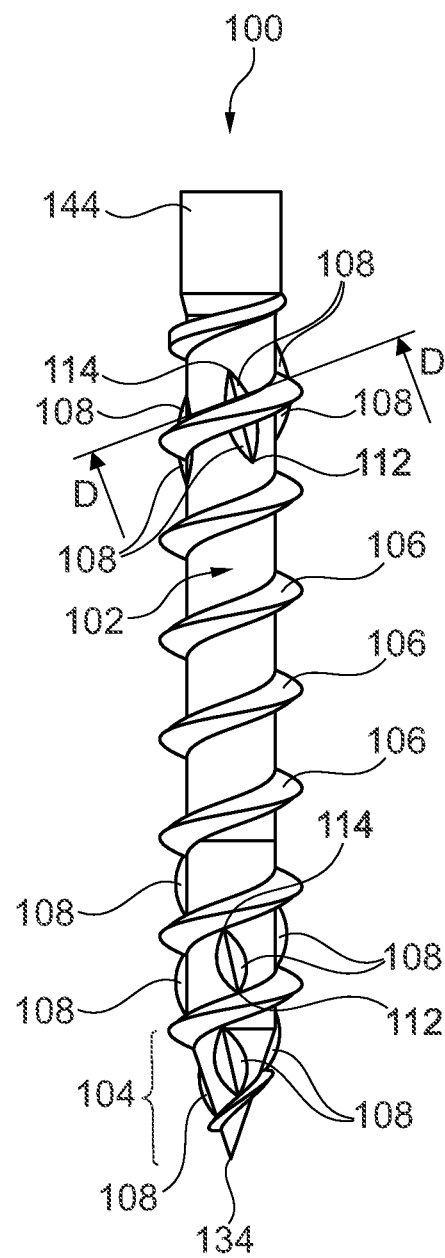
FIG. 14 shows a side view of a shaft section of a wood screw according to another example embodiment of the invention.

Same or similar components in different figures are provided with the same reference numerals.

Before example embodiments of the invention are described with respect to the figures, some general aspects of the invention shall still be explained.

According to an exemplary embodiment of the invention, a protrusion, which may preferably be formed as a milling cutter, may be formed arc-shapedly between two neighboring thread turns on a shaft, a screw tip, one or plural thread turns and/or a transition between at least two of the mentioned elements. The ends of the arc-shaped protrusion, which may be preferably formed as a milling cutter, may end on the neighboring flank of the thread, or end there, where the flank of the thread may meet the shaft. It may also be possible that the arc-shaped protrusion ends with a distance to the neighboring flank of the thread. Thus, a valley (preferably in an axial direction) may remain standing between the maximum height of the arc-shaped protrusion (in particular of the milling cutter) and the neighboring flank of the thread, between (or in) which [valley] the wood (or another material of a substrate, into which the wood screw is inserted) may not be influenced or only influenced very slightly during the screwing-in of the wood screw. During the screwing-in of the wood screw into wood or another substrate material, wood and/or another material may remain in an axial direction between the arc-shaped protrusion, which may be preferably formed as a milling cutter, and the thread turns, which [material] may be grasped neither from the arc-shaped protrusion nor from the thread. If one pulls at the installed wood screw (for example, in the framework of an extinction experiment), the forces, which may be transmitted at this time, may be transmitted via the flanks of the thread into the wood or the other material of the substrate. Because during the screwing-in of the wood screw the arc-shaped protrusion may leave the wood and/or the other substrate material in the vicinity of the flanks of the thread virtually untouched, the supporting wood or the other substrate material may remain standing virtually untouched, which may result in increased extinction forces. The arc-shaped protrusion, which may be formed in particular as a milling cutter, may reduce the screwing-in torque of the wood screw and the radial displacement pressure from the wood or the other material onto the thread core. This may be promoted particularly strongly by a milling effect of an arc-shaped protrusion, which may be formed as a milling cutter.

The strongest cleaving effect during the inserting of the wood screw into a substrate, which may in particular be formed of wood, may occur at the tips of the flanks of the thread. This may be effected independently of whether the arc-shaped protrusion, which may preferably be formed as a milling cutter, may end in the axial direction on the flank of the thread or not. In the case, in which the arc-shaped protrusion ends at a distance to the flank of the thread, more wood or other material may remain in the radial lower area of the flank of the thread (i.e., in the area that is closest to the shaft), which may result in an increase of the extraction force.

A large cleaving effect may occur in a thread core of the thread turns, centrally between two neighboring flanks of the thread. This may occur independently of whether an arc-shaped protrusion, which may be formed with advantage as a milling cutter, is present or not. Because the arc-shaped protrusion may have its maximum radial height centrally between the neighboring flanks of the thread, it may reduce the cleaving action maximally there, where also the cleaving effect may be the largest.

A wood screw according to an example embodiment of the invention may have a cone-shaped tip, a shaft having a thread (formed by the thread turns), and a screw head with a drive. An arc-shaped protrusion, which may be formed as a milling cutter, of a wood screw according to an example embodiment of the invention may run preferably crescent-shapedly between two neighboring flanks of the thread. The radial height of the protrusion may be largest centrally between the neighboring flanks of the thread, and may decline from there towards both ends of the protrusion. The arc-shaped protrusion, which may preferably be formed as a milling cutter, may be formed preferably symmetrically to this maximum height. The ends of the arc-shaped protrusions may end at a distance to the neighboring flanks of the thread.

The cross-section of the protrusion, which may preferably be formed as a milling cutter, may be triangular-shaped, square-shaped, rectangular-shaped or trapezoid-shaped, wherein hybrid form are possible. Along its height profile, edges of the arc-shaped protrusion may be implemented round or sharp-edged. In the first case, the arc-shaped protrusion may act more or less displacingly. In the second case, the arc-shaped protrusion may act more or less as a milling cutter, i.e., cuttingly. Hybrid forms of the two mentioned embodiments may be possible, for example an arc-shaped protrusion that may have a section formed as a milling edge and a section that may be formed as a blunt edge. At least one arc-shaped protrusion, which may be preferably formed as a milling cutter, may be arranged only in the area of a cone-shaped screw tip or only in the shaft section. It may also be possible that such an arc-shaped protrusion is arranged both in the cone-shaped tip and also in the shaft section. This may hold analogically for "displacement bodies".

Arc-shaped protrusions of a wood screw according to an example embodiment of the invention may be arranged angularly offset to each other. For example, the arc-shaped protrusions (in particular formed as a milling cutter) may have an equal angular distance among each other.

According to an example embodiment, the ends of the arc-shaped protrusions may end at a distance to the flanks of the thread. It may also be possible that one or plural arc-shaped protrusions according to an exemplary embodiment of the invention may end there, where the flanks of the thread may meet the core of the thread, or on the flanks of the thread. Hybrid forms from two or three of the three pure forms mentioned before may be possible. The arc-shaped protrusions, which may be formed in particular as milling cutters, may preferably be configured mirror-symmetrically. This may mean that the end section, which may run from the highest radial extension in the direction towards the screw tip, may be formed just like the other end section, which may run from there [from the highest radial extension] in the direction towards the screw head. However, in another embodiment example, it may be possible that the profile is not mirror-symmetrical. For example, the maximum radial height may be shifted to the side of the screw tip or to the side of the screw head.

FIG. 1 shows a wood screw 100 according to an example embodiment in a front view. FIG. 2 shows a wood screw 100 according to FIG. 1 in a side view. FIG. 3 shows the wood screw 100 according to FIG. 1 in a cross-sectional view along a section plane A-A defined in FIG. 2. FIG. 4 shows the wood screw 100 according to FIG. 1 in a top side view. FIG. 5 shows a detail (compare FIG. 3) of the wood screw 100 according to FIG. 4. FIG. 6 shows the wood screw 100 according to FIG. 1 in a bottom side view.

The wood screw 100 represented in FIG. 1 may be embodied as a wood screw and may be manufactured from steel, another metal or plastic material. Stated more precisely, the wood screw 100 may be provided and embodied for a pilot-hole-free end self-cutting and/or thread-furrowing inserting in a wood substrate 124 (see FIG. 13). The wood screw 100 may have a screw head 132, a thread-free bolt section 144, a constant radius (or cylindrical) shaft 102, a cone-shaped screw tip 104 and helical thread turns 106. The thread turns 106 may extend, projecting radially over the shaft 102 and/or the screw tip 104 and running around spirally, on a portion of the shaft 102 through into the screw tip 104. Continuously arced, dome-shaped or arc-shaped protrusions 108 may be formed in some axial areas of the wood screw 100 between two respectively neighboring thread turns 106.

As can be taken from FIG. 1 and FIG. 2, a maximum radial extension r (compare FIG. 7) of the arc-shaped protrusions 108 may be smaller than a maximum radial extension R (compare FIG. 7) of the thread turns 106, which may facilitate an installation of the wood screw 100 with low force and an undisturbed thread-cutting. With the exception of the screw head, thus, the thread turns 106, followed by the optional thread-free bolt section 144 and the arc-shaped protrusions 108, may form those sections of the wood screw 100 that may extend the most radially outwardly. Furthermore, the protrusions 108 may run arc-shapedly in the axial direction 110, i.e. in a direction parallel to a screw axis and/or a central axis or symmetry axis 140 of the constant radius (or conical) shaft 102. A respective end 112, 114 (compare FIG. 7) of two mutually axially opposite ends 112, 114 of the arc-shaped protrusion 108 may end at a respective step-type transition and/or a kink 118 between a thread turn 106 and the shaft 102. Furthermore, the arc-shaped protrusions 108 may have their respective maximum radial extension r axially precisely centrally between two respectively neighboring ones of the thread turns 106. Furthermore, the arc-shaped protrusions 108 may have a crescent shape. In the embodiment example shown, the arc-shaped protrusions 108 may be formed with advantage as sharp-edged milling cutters.

Some of the arc-shaped protrusions 108 may be formed completely in the area of the shaft 102. Other ones of the arc-shaped protrusions 108 may be formed completely in the area of the screw tip. Further arc-shaped protrusions 108 may extend in a transition area between the shaft 102 and the screw tip 104, thereby possibly bridging the same [transition area], i.e. may have a shaft-related section and a screw-tiprelated section. Respective groups of the arc-shaped protrusions 108 may be formed aligned with each other in the axial direction 110 and/or aligned axially with each other. Protrusions 108 of different groups may be offset tangentially angularly to each other. Stated more precisely, in the embodiment example according to FIG. 1 to FIG. 6, plural arc-shaped protrusions 108, which may be aligned in the axial direction 110, may be provided in the area of the screw tip 104, and plural arc-shaped protrusions 108, which may also be aligned in the axial direction 110, may be provided in an end section 122, which may be at the side of the screw head, of the thread turns 106 of the shaft 102.

The arc-shaped protrusions 108 of the wood screw 100 may be formed as a milling cutter and thus may facilitate the screwing-in of the wood screw 100 into a wood substrate 124 with low force. In addition, they may reduce the tendency of the wood to be cleaved under the influence of the thread turns 106, and, furthermore, may increase the extraction force of the wood screw 100 after the installation in a wood substrate 124. The arc-shaped protrusions 108 may also displace wood into formed undercuts 138 (see FIG. 7 to FIG. 11) between the arc-shaped protrusions 108 and the thread turns 106 adjacent thereto, and thereby further increase the extraction force of the wood screw 100.

According to FIG. 1 to FIG. 6, the screw tip 104 may be formed cone-shapedly and may end in a screw tip end point 134. If the wood screw 100 is set with the screw tip end point 134 on a wood substrate 124, and is set in rotation by a driving tool (for example a screwdriver or a cordless screwdriver, not shown), then the screw tip end point 134 may initially penetrate into the wood, whereby the thread turns 106, which may extend through into the screw tip 104, may grasp and may rotatingly dig themselves forward into the substrate 124 in a self-cutting and/or self-furrowing manner. The arc-shaped protrusions 108, which may be formed as a milling cutter, of the wood screw 100 according to FIG. 1 to FIG. 6 then may cut off wood material with their sharp-edged cutting edges in the area of the ridge of the arc-shaped protrusions 108, and may displace wood fibers into intermediate spaces between the arc-shaped protrusions 108 and the thread turns 106. At this time, the wood may remain intact to a far extent. The setting process may end, when a lower side of the screw head 132 abuts on an outer side of the wood substrate 124. Of course, the inserting process of the wood screw 100 into the wood substrate 124 may also be terminated already earlier. Furthermore, it may be possible to arrange intermediately a further element, such as for example a washer, between the screw head 132 and the wood substrate 124. FIG. 1 shows also intermediate thread sections, which may be smooth and may be free from arc-shaped protrusions 108 of the here constant radius shaft (or locally conical shaft) 102 between neighboring thread turns 106. In other intermediate thread sections 126, the axially running, crescent-shaped, arc-shaped protrusions 108 may be formed integrally on the wood screw 100 at the described positions. Because the mutually opposing ends 112, 114 or tails of the arc-shaped protrusions 108 may extend through to the flanks of the neighboring thread turns 106, free areas may form between the thread turn 106 and a protrusion 108 in the form of undercuts 138. During the inserting of the wood screw 100, these areas may fill with wood fibers and thus may impede in addition an extracting of the wood screw 100 from a wood substrate 124 due to a form-fit, a friction-fit and/or a force-fit conveyed thereby.

As shown in FIG. 4, the screw head 132 may have a central area 136 of a front face, which may have a drive (for example, a longitudinal slot, a crossed slot, a hexagon, an AW® drive, etc.) that is not shown. This may make it possible for a drive tool, which is also not represented in the figure, to engage force-fittingly in the screw head 132 and to thereby transmit a torque from the drive tool to the wood screw 100.

FIG. 7 to FIG. 11 show details of arc-shaped protrusions 108 in intermediate thread sections 126 between neighboring thread turns 106 of a wood screw 100 according to example embodiments of the invention.

According to FIG. 7, the two mutually axially opposite ends 112, 114 of the shown arc-shaped protrusion 108 may end at the shaft 102 at an axial distance to an adjoining thread turn 106. Thus, the protrusion 108 according to FIG. 7 may end, at both sides, in the area of the shaft 102. Moreover, the shown arc-shaped protrusion 108 may run, starting from a position with maximum radial extension r, symmetrically in the direction of the two directly neighboring thread turns 106. As is shown in FIG. 7, the arc-shaped protrusion 108, in a cross-section, may be set back radially with respect to the thread turns 106. This may result in that the self-cutting of a helical counter-thread, which may be inverse to the thread turns 106, in the wood substrate 124 may not be disturbed by the arc-shaped protrusion 108 (r<R). A respective undercut 138 for receiving material of a wood substrate 124 (see FIG. 13), into which the wood screw 100 may be inserted, may be formed between the arc-shaped protrusion 108 on the one hand and the two thread turns 106 adjoining thereto on the other hand. The undercuts 138 between the arc-shaped protrusion 108 and the adjoining thread turns 106 may fill with compressed wood fibers during the driving-in of the wood screw 100 into a wood substrate 124. As is also represented in FIG. 7, the thread turns 106 may have, in cross-section, a substantially triangle-shaped form. On the contrary, the protrusion 106 may have the form (or shape) of a dome and/or a crescent.

By contrast to FIG. 7, according to FIG. 8, the arc-shaped protrusion 108 may be formed such that it extends through to an edge between the cylindrical mantle surface of the shaft 102 and the flank of the thread turns 106, which flank may lead down towards the shaft 102. This may result in an undercut 138, which may be pronounced particularly deep, and thus to a strong form-fit between the wood screw 100 and the displaced wood material.

According to FIG. 9, both mutually axially opposite ends 112, 114 of the shown arc-shaped protrusion 108 may end on a flank 116 of a respective one of the thread turns 106, i.e. may not extend at the exposed ends 112, 114 radially through to the shaft 102. According to FIG. 9, the undercut 138 may be formed less pronounced. However, the smaller convex curvature of the arc-shaped protrusion 108 according to FIG. 9 may result in that the driving-in force of the wood screw 100 into the wood substrate 124 may be decreased further.

The embodiment examples according to FIG. 7 to FIG. 9 all show a mirror-symmetrical configuration of the arc-shaped protrusion 108 with respect to a symmetry axis 140. This structural symmetry may result in a symmetrical force transmission into the wood screw 100, and thereby result in an avoidance of force peaks.

According to FIG. 10, the shown arc-shaped protrusion 108 may run, starting from a position with a maximum radial extension r, asymmetrically in an axial (i.e. horizontal according to FIG. 10) direction in the direction of two neighboring thread turns 106 through to the ends 112, 114. Thus, according to FIG. 10, the material distribution in the arc-shaped protrusion 108 between the neighboring thread turns 106 may be asymmetrical, and may be shifted here predominantly to the left. Stated otherwise, the position of the maximum radial extension (r) of the arc-shaped protrusion 108 according to FIG. 10 may be closer to the one neighboring thread turn 106 than to the other neighboring thread turn 106. Thereby, a narrow deep undercut 138 and a wide shallow undercut 138 may be achieved, wherein the extraction force may be further increased by this asymmetrical configuration.

According to FIG. 11, the shown arc-shaped protrusion 108 may run, starting from a position with maximum radial extension r, also asymmetrically in the direction of two neighboring thread turns 106. FIG. 11 shows an embodiment example similar to FIG. 10, wherein according to FIG. 11 the asymmetrical material distribution of the arc-shaped protrusion 108 may be shifted to the right instead of to the left, i.e. away from the end 112 and towards the end 114.

FIG. 12 shows strongly schematically a section of a wood screw 100 according to an example embodiment, in which plural arc-shaped protrusions 108 may be offset with respect to each other with a respective equal tangential angular distance of, here, 90°. FIG. 12 shows a kind of plan view of a cross-section of a wood screw 100 according to an example embodiment of the invention, and illustrates that in this case four arc-shaped protrusions 108, which may be distributed angularly symmetrically, may be formed on the shaft 102. The relative angular distance of two neighboring arc-shaped protrusions 108 may amount to 90° in this embodiment example. This may result in a force transmission, which may be symmetrical in a tangential direction, into the wood substrate 124, and to a reliable anchorage.

FIG. 13 shows a wood screw 100 according to an example embodiment after the screwing-in into a wood substrate 124. Stated more precisely, FIG. 13 shows the result of the driving-in of a wood screw 100, such as the one shown in FIG. 1 to FIG. 6, into the wood substrate 124 of solid wood. It is represented schematically in a detail 148, how wood fibers 142 may accumulate in the area of the arc-shaped protrusions 108 and/or may be compacted or compressed there. This may increase the extraction force without excessively damaging the wood material of the wood substrate 124. An optional washer 150 is also represented.

Figure 15:
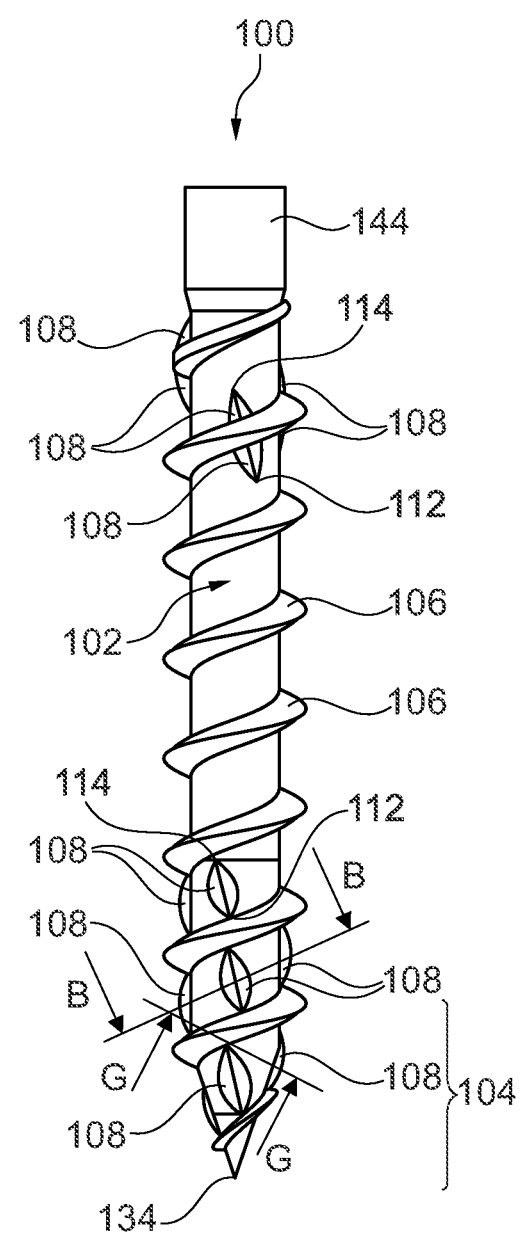
FIG. 15 shows another side view of the shaft section according to FIG. 14.
Figure 16:
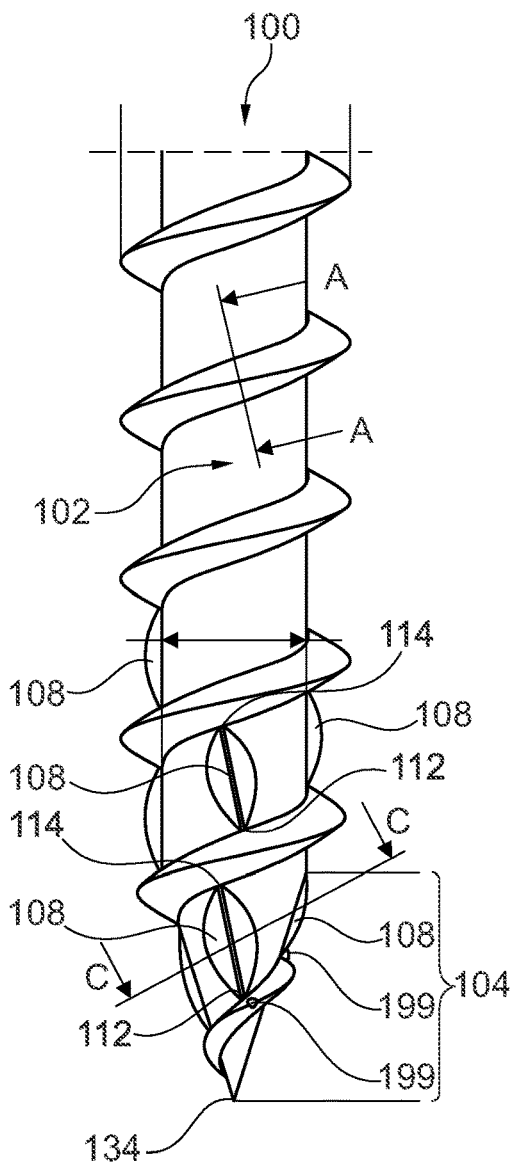
FIG. 16 shows a magnified view of an end area of the shaft section according to FIG. 14 and FIG. 15 at a side of the screw tip.
Figure 18:
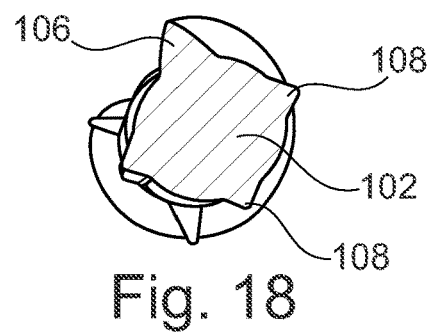
FIG. 18 shows a cross-sectional view according to a section line B-B according to FIG. 15.
Figure 19:
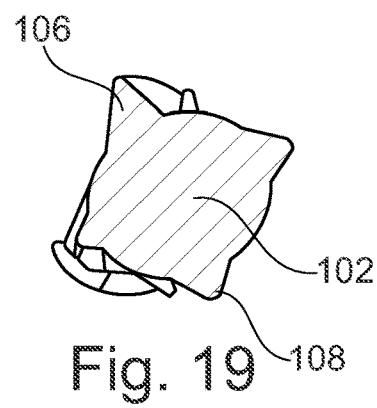
FIG. 19 shows a cross-sectional view according to a section line C-C according to FIG. 16.
Figure 20:
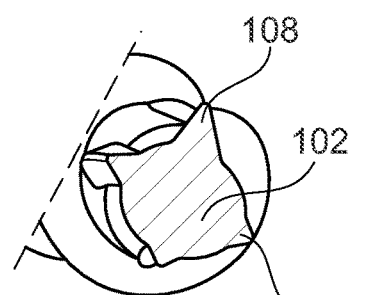
FIG. 20 shows a cross-sectional view according to a section line G-G according to FIG. 15.
Figure 17:
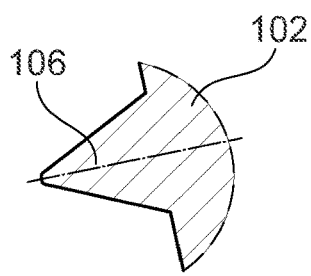
FIG. 17 shows a cross-sectional view according to a section line A-A according to FIG. 16.
Figure 21:
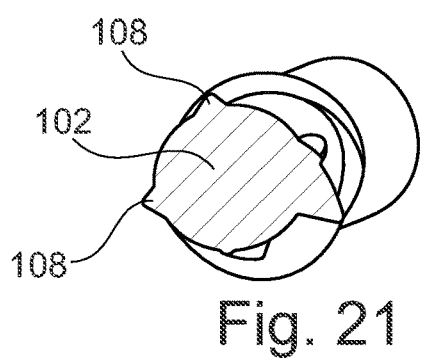
FIG. 21 shows a cross-sectional view according to a section line D-D according to FIG. 14.
Figure 22:
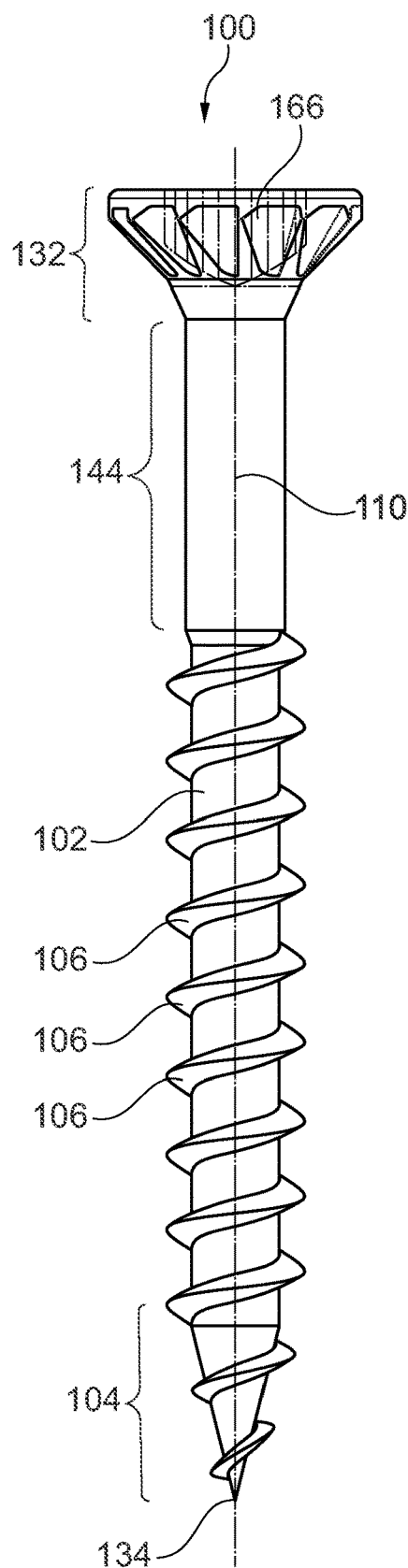
FIG. 22 shows the wood screw according to FIG. 14 to FIG. 21 without representation of protrusions (i.e. the protrusions are blended out in FIG. 22).
Figure 23:
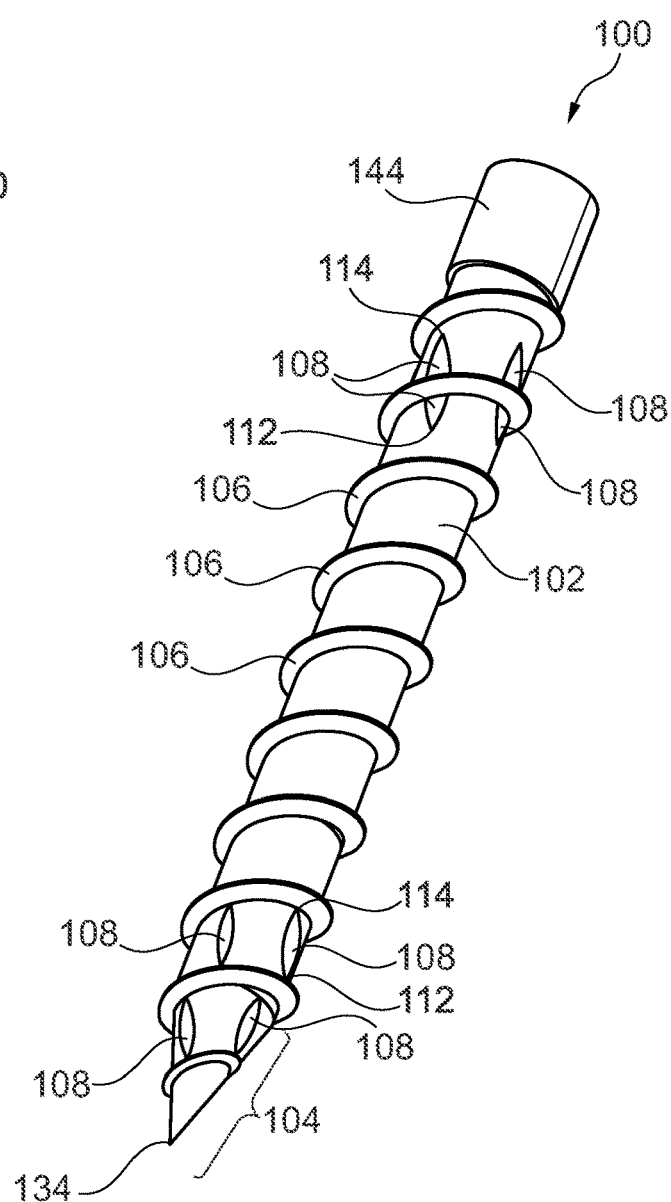
FIG. 23 shows a three-dimensional view of the shaft section according to FIG. 14 to FIG. 22.

FIG. 14 shows a side view of a shaft section of a wood screw 100 according to another example embodiment of the invention. FIG. 15 shows another side view of the shaft section according to FIG. 14. FIG. 16 shows a magnified view of an end area of the shaft section according to FIG. 14 and FIG. 15 at the side of the screw tip. FIG. 17 shows a cross-sectional view according to a section line A-A according to FIG. 16. FIG. 18 shows a cross-sectional view according to the section line B-B according to FIG. 15. FIG. 19 shows a cross-sectional view according to a section line C-C according to FIG. 16. FIG. 20 shows a cross-sectional view according to a section line G-G according to FIG. 15. FIG. 21 shows a cross-sectional view according to a section line D-D according to FIG. 14. FIG. 22 shows the wood screw 100 according to FIG. 14 to FIG. 21 without representation of protrusions 108. FIG. 23 shows a three-dimensional view of the shaft section according to FIG. 14 to FIG. 22.

The wood screw 100 represented in FIG. 14 to FIG. 23 may also be embodied for a pilot-hole-free and self-cutting and/or thread-furrowing inserting into a wood substrate. The wood screw 100 may have a screw head 132 possibly having a drive 166 (compare FIG. 22), an optional thread-free bolt section 144, a constant radius (or cylindrical) shaft 102, a cone-shaped screw tip 104, and helical thread turns 106. The thread turns 106 may extend, starting from a screw tip end point 134, across the shaft 102, and end at an optional thread-free bolt section 144 in the represented embodiment example, or, alternatively, reach through to the screw head 132 (not shown). The screw head 132 may have the drive 166 represented in FIG. 22. This may make it possible for a non-represented drive tool to engage form-fittingly in the screw head 132 and thereby transmit a torque from the drive tool to the wood screw 100. The screw tip 104 may be formed cone-shapedly and may end in the punctiform screw tip end point 134. The thread turns 106 may extend, projecting radially over the shaft 102 and/or the screw tip 104 and running around spirally, on a portion of the shaft 102 through into the screw tip 104.

Continuously curved, dome-shaped, arc-shaped and/or crescent-shaped protrusions 108 may be formed in some axial areas of the wood screw 100 between two respective neighboring thread turns 106, and may be inclined with respect to an axial direction 110 of the wood screw 100 by an acute angle (for example in a range between 5° and 40°). These protrusions 108 may be located in the area of the screw tip 104 and in the area of the shaft 102 adjoining thereto. A respective end 112, 114 of two mutually axially opposite ends 112, 114 of these arc-shaped protrusions 108 may end at a kink and/or at a transition between a thread turn 106 and the shaft 102. Furthermore, these arc-shaped protrusions 108 may have their respective maximum radial extension axially approximately centrally between two respective neighboring ones of the thread turns 106.

Other ones of such, for example crescent-shaped, protrusions 108 may extend over a thread turn 106, i.e. may intersect the latter. In the represented embodiment example, the latter protrusions 108 may be formed in an area of the shaft 102, to which the thread-free bolt section 144 may adjoin. These arc-shaped protrusions 108 may have their respective maximum radial extension in the range of a respective maximum of the respective thread turn 106.

A maximum radial extension of both types of protrusions 108 (i.e. those between thread turns 106 and those, which may intersect a thread turn 106 in the axial direction) may be smaller than a maximum radial extension of the thread turns 106. With the exception of the screw head 132, thus, the thread turns 106 may form those sections of the wood screw 100 that extend the most far radially outwardly.

Furthermore, in the represented embodiment example, all protrusions 108 may run arc-shapedly at an acute angle to an axial direction 110, i.e. may be inclined with respect to the axial direction 110. Alternatively, however, the protrusions 108, which may be arranged between the thread turns 106, and/or the protrusions 108, which may intersect the thread turns 106, may also be arranged running along the axial direction 110. In particular, a protrusion 108 between thread turns 106 may be arranged running perpendicular to these thread turns 106. Alternatively or supplementarily, a further protrusion 108, which may intersects a thread turn 106, may be arranged running perpendicular to this thread turn 106. It may also be possible that the protrusions 108, which may be arranged between thread turns 106, and the further protrusions 108, which may intersect a thread turn, may be arranged running parallel to each other.

In the described embodiment example, the arc-shaped protrusions 108, which may run between thread turns, and those, which may intersect thread turns 106, may be formed as milling cutters, and thus may facilitate and/or ease the screwing-in of the wood screw 100 into a wood substrate.

The arc-shaped further protrusions 108, which may intersect the thread turns 106, may contribute to displace wood fibers during the inserting of the wood screw 100 into a substrate, which may have wood or which may consist of wood, in order to possibly promote a widening-out of the borehole at its outer side. These further protrusions 108 in a transition area between the shaft section having the thread turns 106 and the thread-free bolt section 144 (which may have a slightly larger outer diameter than the shaft section having the thread turns 106, as is shown in FIG. 14 and FIG. 15) may suppress a bracing (or strutting apart) of the wood, when the thread-free bolt section 144 penetrates into the wood substrate. In this manner, the further protrusions 108 may prepare the hole at the transition between the thread-free bolt section 144 and the shaft section having the thread turns 106. In addition, they may reduce the tendency of the wood to be cleaved under the influence of the thread turns 106.

Also, the arc-shaped protrusions 108 may displace wood into undercuts (compare reference numeral 138 in FIG. 7 to FIG. 11) that may be formed between the arc-shaped protrusions 108 and the thread turns 106 neighboring thereto.

If the wood screw 100 is set with the screw tip end point 134 on a wood substrate and is set in rotation by a driving tool (for example a screwdriver or a cordless screwdriver, not shown), then the screw tip end point 134 may initially penetrate into the wood, whereby the thread turns 106, which may extend through into the screw tip 104, may grasp and may rotatingly dig themselves forward into the wood substrate in a self-cutting and/or self-furrowing manner. The arc-shaped protrusions 108 of the wood screw 100, which may be formed as milling cutters, then may cut off wood material in the area of the ridge of the arc-shaped protrusions 108, and may displace wood fibers into intermediate spaces between the arc-shaped protrusions 108 and the thread turns 106. At this time, however, the wood may remain intact to a large extent.

As shown in FIG. 16, three small notches 199 or recesses may be formed in the area of the foremost thread turn 106 at the screw tip 104, which [notches] may be arranged at an angular distance to each other of 120°. Demonstratively, the notches 199 may form teeth in the form of recesses in the thread turn 106, which may promote a penetration into the wood substrate at the beginning of the installation process of the wood screw 100.

Supplementarily, it is to be noted, that "comprising" or "having" does not exclude other elements or steps, and "a" or "an" does not exclude a plurality. Furthermore, it is pointed out that features or steps, which are described with reference to one of the above embodiment examples, may also be used in combination with other features or steps of other embodiment examples described above. Reference numerals in the claims are not to be construed as limitations.

The invention claimed is:

1. A wood screw, comprising:
   a shaft,
   a screw tip,
   thread turns, which run circumferentially on at least a portion of the shaft through the screw tip, and
   at least one crescent-shaped protrusion between at least two adjacent ones of the thread turns;
   wherein in a front view of the screw, a main extension direction of the crescent-shaped protrusion deviates counter-clockwise from an axial direction of the shaft by an angle being greater than 0° and less than 90°.

2. The wood screw according to claim 1,
   wherein a maximum radial extension, r, of the at least one crescent-shaped protrusion is smaller than a maximum radial extension, R, of the thread turns, or
   wherein the at least one crescent-shaped protrusion has its maximum radial extension, r, centrally between the at least two adjacent ones of the thread turns.

3. The wood screw according to claim 1, having at least one of the following features:
   at least one end of two mutually axially opposite ends of the at least one crescent-shaped protrusion ends on a flank of one of the at least two adjacent ones of the thread turns,
   at least one end of two mutually axially opposite ends of the at least one crescent-shaped protrusion ends at a kink between one of the at least two adjacent ones of the thread turns and the shaft,
   at least one end of two mutually axially opposite ends of the at least one crescent-shaped protrusion ends on the shaft at a distance to one of the at least two adjacent ones of the adjacent thread turns.

4. The wood screw according to claim 1,
   wherein the screw tip is cone-shaped.

5. The wood screw according to claim 1,
   wherein the at least one crescent-shaped protrusion, starting from a central position having a maximum radial extension, r, runs symmetrically to mutually opposite ends of the protrusion in a direction towards the at least two adjacent thread turns, however not extending axially beyond the at least two adjacent thread turns.

6. The wood screw according to claim 1, wherein the at least one crescent-shaped protrusion is formed in one of the following manners:
   the at least one crescent-shaped protrusion is formed as a sharp-edged milling cutter,
   the at least one crescent-shaped protrusion is formed blunt-edgedly,
   the at least one crescent-shaped protrusion is formed only in an area of the shaft, the at least one crescent-shaped protrusion is formed only in an area of the screw tip, the at least one crescent-shaped protrusion extends in a transition area between the shaft and the screw tip.

7. The wood screw according to claim 1,
   wherein at least two crescent-shaped protrusions are offset tangentially angularly to each other such that plural crescent-shaped protrusions are offset among each other at a respective similar tangential angular distance to each other.

8. The wood screw according to claim 1,
   wherein plural crescent-shaped protrusions are aligned in an axial direction.

9. The wood screw according to claim 1, having plural crescent-shaped protrusions, which are aligned in an axial direction, in an area of the screw tip and plural crescent-shaped protrusions, which are also aligned in the axial direction, in an end section, which is located on a screw head side, of the thread turns of the shaft.

10. The wood screw according to claim 1,
    wherein an undercut for receiving material of a wood substrate, when the wood screw is inserted into the wood substrate, is formed between a respective one of the at least one crescent-shaped protrusion on the one hand and at least one of the respective two thread turns adjoining thereto.

11. The wood screw according to claim 1, formed for a pilot-hole-free inserting into a wood substrate.

12. The wood screw according to claim 1, having at least one further protrusion, which extends over one of the thread turns,
    wherein the at least one further protrusion is crescent-shaped, the wood screw having a plurality of further protrusions, which extend beyond one of the thread turns, which further protrusions are spaced at a distance from each other and are arranged circumferentially around the shaft, wherein the at least one further protrusion is formed in an area of the shaft, to which area a screw head or a thread-free bolt section joins, wherein the at least one further protrusion has its maximum radial extension in an area of a respective maximum of the respective thread turn, wherein a maximum radial extension of the at least one further protrusion is smaller than a maximum radial extension of the associated thread turn.

13. The wood screw according to claim 12, wherein the at least one further protrusion is arranged running at an acute angle to an axial direction of the shaft.

14. The wood screw according to claim 12, having at least one of the following features:

wherein the at least one protrusion is arranged running perpendicular to the at least two ones of the adjacent thread turns, between which the at least one protrusion is located, wherein the at least one further protrusion is arranged running perpendicular to the thread turn, over which the at least one further protrusion extends.

15. The wood screw according to claim 1, wherein at least one of the thread turns in an area of the screw tip has a set of notches that are offset to each other in the circumferential direction.

16. A method for inserting a wood screw into a wood substrate, the method comprising:

providing the wood substrate without a pilot hole;

screwing-in of the wood screw into the wood substrate, the wood screw comprising:

a shaft, a screw tip, thread turns which run circumferentially on at least a portion of the shaft, wherein the wood screw is arranged with at least one crescent-shaped protrusion located between adjacent thread turns, wherein in a front view of the screw, a main extension direction of the crescent-shaped protrusion deviates counter-clockwise from an axial direction of the shaft by an angle being greater than 0° and less than 90°.

17. A method for manufacturing a wood screw, the method comprising:

forming a shaft and a screw tip, which adjoins axially thereto, forming thread turns, which extend circumferentially on at least a portion of the shaft to the screw tip, and forming at least one crescent-shaped protrusion between adjoining thread turns on the shaft;

wherein in a front view of the screw, a main extension direction of the crescent-shaped protrusion deviates counter-clockwise from an axial direction of the shaft by an angle being greater than 0° and less than 90°.

* * * * *